United States Patent
Chen et al.

(10) Patent No.: US 10,108,368 B2
(45) Date of Patent: Oct. 23, 2018

(54) HEAT MAP TRANSFER IN SPACE-EFFICIENT STORAGE

(71) Applicant: International Business Machines Corporation, Armonk, NY (US)

(72) Inventors: Duo Chen, Shanghai (CN); Min Fang, Shanghai (CN); Da Liu, Shanghai (CN); Jinyi Pu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 15/401,379

(22) Filed: Jan. 9, 2017

(65) Prior Publication Data

US 2018/0196606 A1    Jul. 12, 2018

(51) Int. Cl.
G06F 12/00 (2006.01)
G06F 3/06 (2006.01)
G06F 11/14 (2006.01)

(52) U.S. Cl.
CPC ............ G06F 3/065 (2013.01); G06F 3/0619 (2013.01); G06F 3/0646 (2013.01); G06F 3/0647 (2013.01); G06F 3/0683 (2013.01); G06F 3/0689 (2013.01); G06F 11/1446 (2013.01); G06F 11/1448 (2013.01); G06F 11/1458 (2013.01)

(58) Field of Classification Search
CPC ............ G06F 11/1446; G06F 11/1448; G06F 11/1458
See application file for complete search history.

(56) References Cited

U.S. PATENT DOCUMENTS

| 9,053,167 | B1 | 6/2015 | Swift et al. |
| 9,275,063 | B1 | 3/2016 | Natanzon |
| 2015/0227467 | A1* | 8/2015 | Benhase ............ G06F 12/0866 711/122 |

FOREIGN PATENT DOCUMENTS

GB    2493243 A    1/2013

OTHER PUBLICATIONS

Martin Glassborow, "Automated Storage Tiering Product Comparison", ComputerWeekly.com, Jun. 16, 2016, 5 pages.
(Continued)

*Primary Examiner* — Shawn X Gu
(74) *Attorney, Agent, or Firm* — Kunzler, PC

(57) ABSTRACT

The system includes a plurality of storage volumes, a data synchronization module, a space-efficient storage module, and a heat data module. A second storage volume of the plurality of storage volumes includes a backup storage location for a first storage volume. The data synchronization module, coupled to the first storage volume and the second storage volume, provides a backup by synchronizing information from the first storage volume to the second storage volume during a synchronization event. The information includes data chunks, heat map data, and first metadata. The space-efficient storage module receives the information from the data synchronization module and allocates the information to the second storage volume in accordance with a space-efficient storage model. The heat data module reads the first metadata and the heat map data and adjusts a location of the data chunks in the second storage volume based on the heat map data.

20 Claims, 7 Drawing Sheets

(56) References Cited

OTHER PUBLICATIONS

Oracle FS1-2 Flash Storage system Software Features, Oracle Data Sheet, 2014, 5 pages.
Bert Dufrasne & Artur Borowocz, "IBM DS8870 Easy Tier Heat Map Transfer", IBM Redpaper, Jun. 2015, 32 pages.

* cited by examiner

HEAT MAP TRANSFER IN SPACE-EFFICIENT STORAGE

FIELD

The subject matter disclosed herein relates to heat map transfer and more particularly relates to heat map transfer in space-efficient storage systems.

BACKGROUND

Error or failure protection strategies provide backup for systems and data needed to operate. Some of the data used in the operation of a system or site includes heat map data. Heat map data is information which relates to the frequency in which an asset is accessed, written to, read, executed, or otherwise utilized. Heat map data provides a resource for improving the efficiency of a system by allocating resources where they are more fully applied based on their characteristics.

BRIEF SUMMARY

A heat map transfer system is disclosed. The system includes a plurality of storage volumes, a data synchronization module, a space-efficient storage module, and a heat data module. The plurality of storage volumes includes a first storage volume and a second storage volume. The second storage volume includes a backup storage location for the first storage volume. The data synchronization module is coupled to the first storage volume and the second storage volume. The data synchronization module provides a backup of information on the first storage volume by synchronizing information from the first storage volume to the second storage volume during a synchronization event. The information includes data chunks, heat map data relating to the data chunks, and first metadata relating to the first storage volume. The space-efficient storage module is coupled to the second storage volume. The space-efficient storage module receives the information from the data synchronization module and allocates the information to the second storage volume in accordance with a space-efficient storage model. The heat data module is coupled to the second storage volume. The heat data module reads the first metadata and the heat map data and adjusts a location of the data chunks in the second storage volume based on the heat map data.

A method is also disclosed. The method includes synchronizing a data chunk, first metadata, and heat map data from a first storage volume to a second storage volume based on a space-efficient storage model. The method also includes determining a status for the data chunk based on the first metadata and the heat map data. The method also includes determining a location of the data chunk as assigned by the space-efficient storage model on the second storage volume based on second metadata corresponding to the second storage volume. The method also includes applying the determined status to the data chunk on the second storage volume.

A computer program product for providing heat map organization of a data chunk on a space-efficient backup storage is also disclosed. The computer program product includes a computer readable storage medium having program instructions embodied therewith. The program instructions readable/executable by a processor to cause the processor to synchronize the data chunk, first metadata, and heat map data from a first storage volume to a second storage volume based on a space-efficient storage model. The program instructions readable/executable by the processor are further to cause the processor to determine a status for the data chunk based on the first metadata and the heat map data. The program instructions readable/executable by the processor are further to cause the processor to determine a location of the data chunk as assigned by the space-efficient storage model on the second storage volume based on second metadata corresponding to the second storage volume. The program instructions readable/executable by the processor are further to cause the processor to apply the determined status to the data chunk on the second storage volume.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
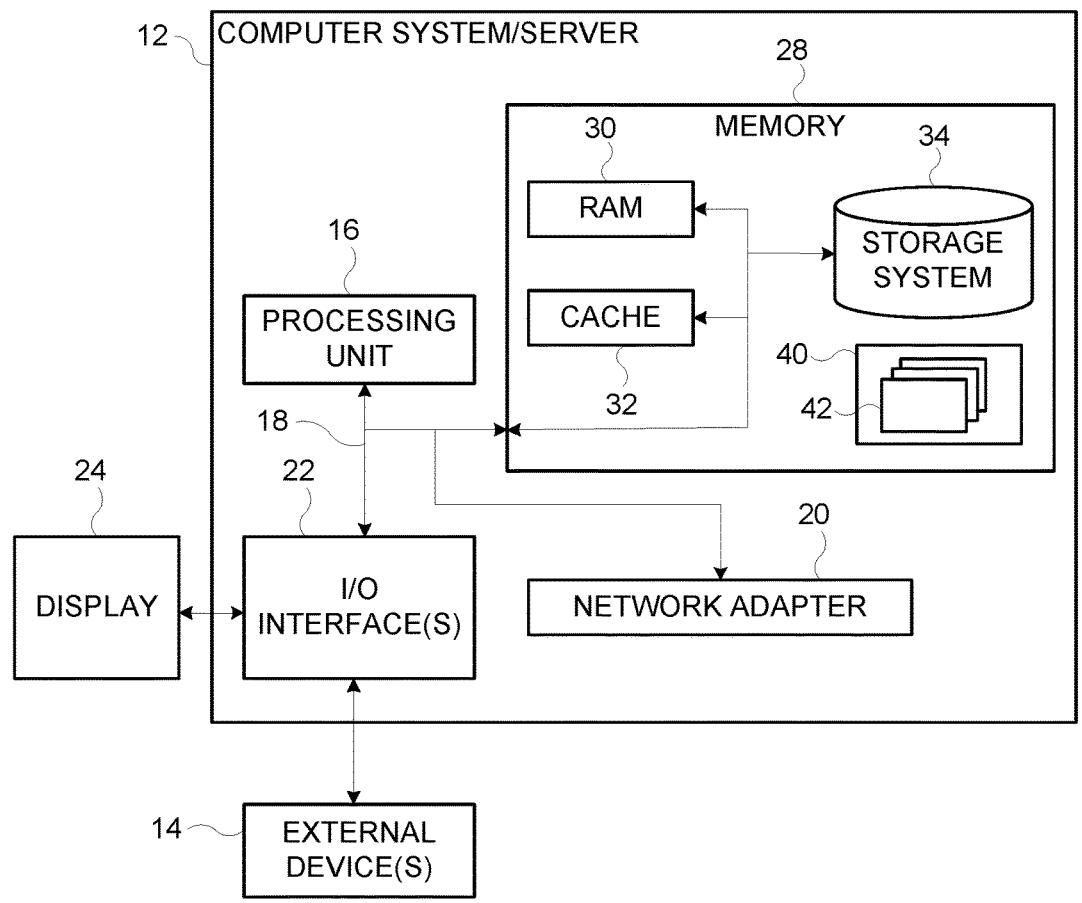
FIG. 1 is a schematic diagram illustrating one embodiment of a computer system which is applicable to implement the embodiments of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The computer program product may be deployed by manually loading directly in the client, server, and proxy computers via loading a computer readable storage medium such as a CD, DVD, etc., the computer program product may be automatically or semi-automatically deployed into a computer system by sending the computer program product to a central server or a group of central servers. The computer program product is then downloaded into the client computers that will execute the computer program product. Alternatively, the computer program product is sent directly to the client system via e-mail. The computer program product is then either detached to a directory or loaded into a directory by a button on the e-mail that executes a program that detaches the computer program product into a directory. Another alternative is to send the computer program product directly to a directory on the client computer hard drive. When there are proxy servers, the process will, select the proxy server code, determine on which computers to place the proxy servers' code, transmit the proxy server code, then install the proxy server code on the proxy computer. The computer program product will be transmitted to the proxy server and then it will be stored on the proxy server.

The computer program product, in one embodiment, may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally, the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions which identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server, and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely, parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

The computer program product, in one embodiment, may be deployed, accessed, and executed using a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the computer program product (i.e. the software resides elsewhere) wherein the lifetime of the VPN is limited to a given period of time or a given number of deployments based on an amount paid.

The computer program product may be deployed, accessed, and executed through either a remote-access or a site-to-site VPN. When using the remote-access VPNs the computer program product is deployed, accessed, and executed via the secure, encrypted connections between a company's private network and remote users through a third-party service provider. The enterprise service provider (ESP) sets up a network access server (NAS) and provides the remote users with desktop client software for their computers. The telecommuters can then dial a toll-free number or attach directly via a cable or DSL modem to reach the NAS and use their VPN client software to access the corporate network and to access, download and execute the computer program product.

When using the site-to-site VPN, the computer program product is deployed, accessed, and executed through the use of dedicated equipment and large-scale encryption that are used to connect a company's multiple fixed sites over a public network such as the Internet.

The computer program product is transported over the VPN via tunneling which is the process of placing an entire packet within another packet and sending it over a network. The protocol of the outer packet is understood by the network and both points, called tunnel interfaces, where the packet enters and exits the network.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

FIG. 1 shows an exemplary computer system/server 12 which is applicable to implement the embodiments of the present disclosure. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a storage media (not shown and typically called a "drive"). Although not shown, a magnetic disk drive for reading from and writing to a removable, non-volatile solid state drive, magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data, or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. While not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In one embodiment, the computer system/server 12 provides failure protection for systems, apparatuses, data, or other information or processes by backing up the contents of the storage system 34. In some embodiments, the computer system/server 12 copies data (made up of at least one data chunk or other unit of data), heat map data, and metadata from the storage system 34 (hereinafter "first storage volume") to a second or backup storage volume (not shown).

In some embodiments, the second storage volume stores incoming data based on a space-efficient storage model which distributes each unit or data chunk to a location on the second storage volume. In some embodiments, the physical location of the data chunk is different from the location of the same data chunk on the first storage volume. This change in distribution of the data chunk renders the heat map data developed on the first storage volume inaccurate for the second storage volume. The change in distributions is described in greater detail below with reference to FIG. 2.

Instead of restarting the heat map learning process for the second storage volume, first metadata from the first storage volume and second metadata from the second storage volume is used in conjunction with the heat map data to apply a status to the data chunk on the second storage volume and move the data chunk to a corresponding performance tier on the second storage volume. The heat map data can then be used by the second storage volume to avoid having to restart building the map.

Figure 2:
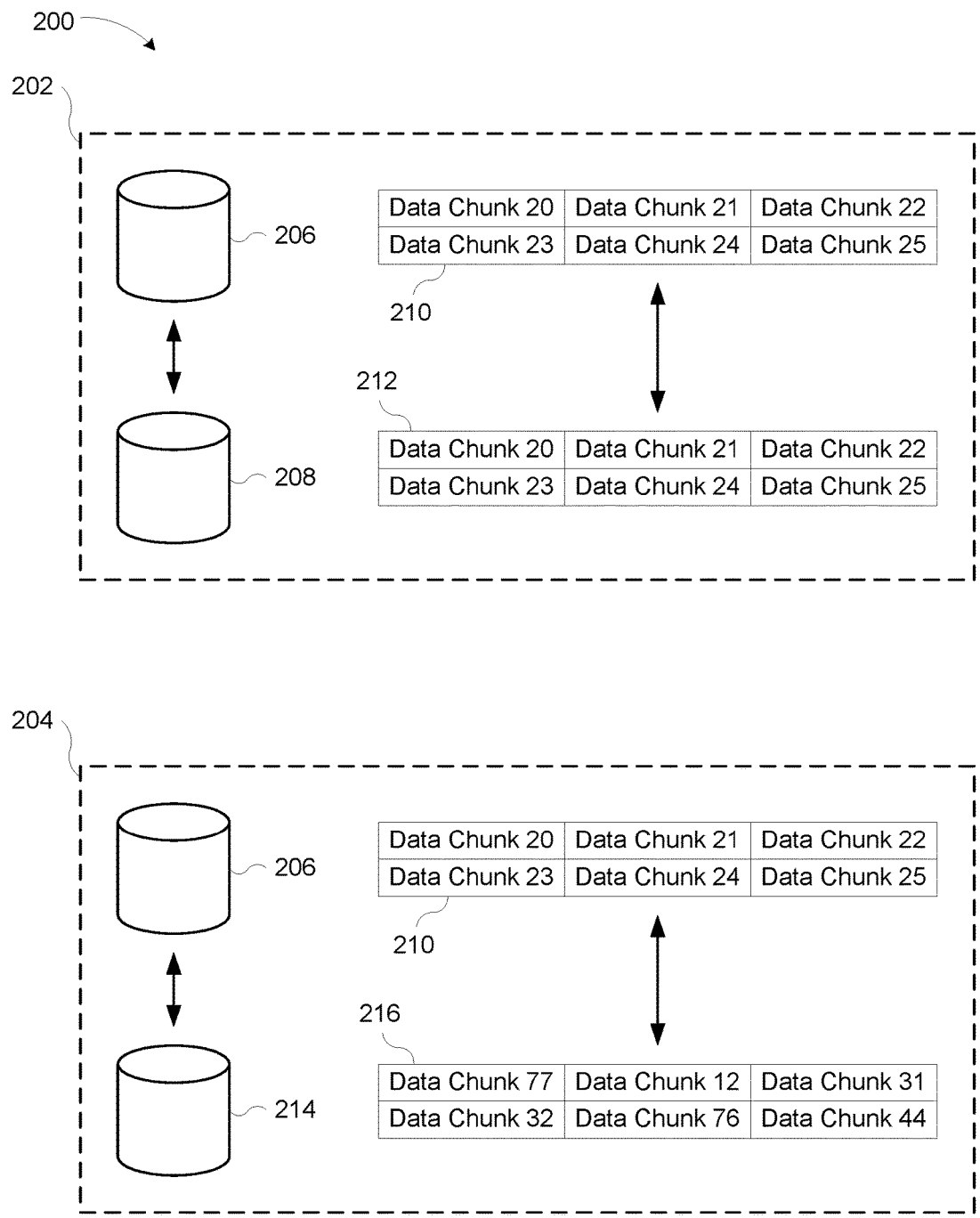
FIG. 2 is a schematic diagram illustrating one embodiment of a data backup in a standard model and a space-efficient model in accordance with the present invention.

FIG. 2 is a schematic diagram illustrating one embodiment of a data backup in a standard model 202 and a space-efficient model 204 in accordance with the present invention. In the illustrated embodiment, the standard model 202 includes a first storage volume 206 and a second storage volume 208 having a standard storage model. As data is transferred from the first storage volume 206 to the standard second storage volume 208, the second storage volume 208 implements the standard storage model which copies an original distribution 210 of data chunks directly to a standard backup distribution 212.

In the space-efficient model 204, the original distribution 210 is copied from the first storage volume 206 to a space-efficient second storage volume 214. As the original distribution 210 is received at the space-efficient second storage volume 214, the space-efficient second storage volume 214 rearranges the data chunks into a space-efficient distribution 216. In the illustrated embodiment, the data chunks in the space-efficient distribution 216 are no longer in the original distribution 210. This can render heat map data from the first storage volume 206 inaccurate for the space-efficient distribution 216 on the space-efficient second storage volume 214.

In some of the embodiments described herein, the first storage volume 206 sends backup information to the second storage volume 214 which includes the data chunks, heat map data, and first metadata (described in greater detail below regarding FIG. 3).

In some embodiments, the second storage volume 214 receives the backup data from the first storage volume 106. In other embodiments, the second storage volume 214 uses the heat map data and the first metadata to apply a status to each data chunk stored at the second storage volume 214. In some embodiments, the status of each data chunk is used to promote or move the data chunks to locations having a performance commensurate with the applied status. Status application and data chunk promotion is described in greater detail below with respect to FIGS. 5-6.

Figure 3:
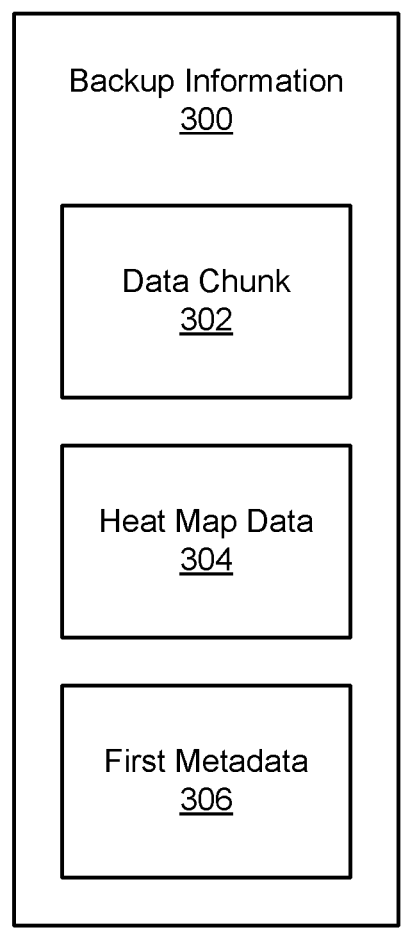
FIG. 3 is a block diagram illustrating one embodiment of a backup information module in accordance with the present invention.

FIG. 3 is a block diagram illustrating one embodiment of a backup information module 300 in accordance with the present invention. In the illustrated embodiment, the backup information module 300 includes at least one data chunk 302, heat map data 204, and first metadata 306. In some embodiments, the at least one data chunk 302 is a copy of an original data chunk located on a first storage volume.

In some embodiments, the first storage volume is a primary storage volume used to provide access to the original version of the data chunk 302 for a system, site, service, or other entity. The data chunk 302 is copied from the first storage location to a second storage location during a synchronization event. In some embodiments, the synchronization event is a collection and delivery of the components of the backup information module 300 from the first storage volume to the second volume where no previous copies of the backup information module 300 exists or an event triggering such a collection and delivery. In another embodiment, the synchronization event is an update of one or more components of the backup information module 300 previously stored to the second storage volume.

In some embodiments, updating one or more components of the backup information module 300 on the second storage volume includes rewriting the data chunk 302 to the second storage volume. In some embodiments, rewriting the data chunk 302 to the second storage volume includes overwriting at least a portion of the existing data chunk 302 on the second storage volume or writing the data chunk 302 to a location different from the location of the existing data chunk 302 on the second storage volume and marking the location of the existing data chunk 302 as space available for writing. Other updating processes may be applied.

In some embodiments, the heat map data 304 describes a tier or workload level corresponding to the data chunk 302. In some embodiments, the tier includes a data chunk extent or other structure capable of storing a plurality of data chunks. In other embodiments, the heat map data 304 describes a frequency or other workload metric for the data chunk 302 itself or its corresponding extent as recorded on the first storage volume. In other embodiments, the heat map data 304 corresponds to an extent of the data chunk 302 sent from the first storage volume. In some embodiments, the heat map data 304 includes usage data for the data chunk 302 as well as other data chunks that are or are not included in the backup information module 300. For example, the heat map data 304 may include usage data for a data chunk which was previously sent from the first storage volume to the second storage volume and whose content has not changed but whose heat map data has changed or whose content may be updated as well as the usage.

The illustrated embodiment of the backup information 300 also includes the first metadata. In some embodiments, the first metadata 306 describes a location of the original copy of the data chunk 302 still stored on the first storage volume. In some embodiments, the first metadata 306 describes a relation between a virtual disk location and a physical disk location for the data chunk 302 on the first storage volume. In some embodiments, the first metadata 306 identifies an extent on the first storage volume to which the data chunk 302 has been stored.

In some embodiments, the first metadata 306 can be applied to the heat map data 304 to determine a status of each data chunk 302 on the first storage volume. In some embodiments, the first metadata 306 provides a storage location for the data chunk 302 (such as an extent or address) on the first storage volume which can be looked up on the heat map data 304 to determine a status for the data chunk 302.

In some embodiments, in response to a determination of the status of the data chunk 302 based on the heat map data 304 and the first metadata 306, the second storage volume may look up the location of the data chunk 302 on the second storage volume. In some embodiments, the location of the data chunk 302 on the second storage volume is based on second metadata (not shown) generated when the data chunk 302 was stored to the second storage volume.

In the illustrated embodiment, the data chunk 302, heat map data 304, and first metadata 306 are separate and distinct. In other embodiments, one or more of the data chunk 302, the heat map data 304 and the first metadata 302 may be combined into a unified unit of information. For example, the heat map data 304 and the first metadata 306 may be combined. Other organizations or structures may be applied to the backup information 300.

Figure 4:
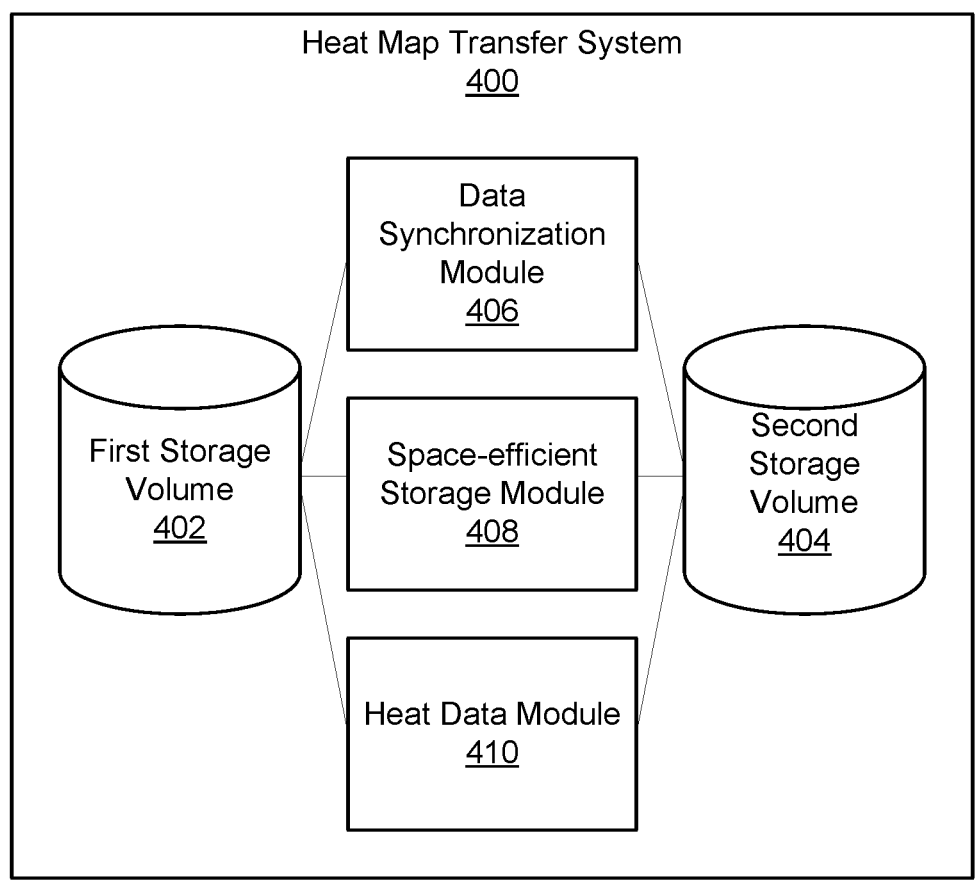
FIG. 4 is a block diagram illustrating one embodiment of a heat map transfer system in accordance with the present invention.

FIG. 4 is a block diagram illustrating one embodiment of a heat map transfer system 400 in accordance with the present invention. The illustrated embodiment includes a first storage volume 402 and a second storage volume 404. In some embodiments, the first storage volume 402 and the second storage volume 404 are separate physical storage devices. In other embodiments, they are distinct portions of the same physical storage device or collection of physical storage devices (such as a virtual disk of a storage network or collection of storage devices connected in a network).

In the illustrated embodiment, the first storage volume 402 and the second storage volume 404 are in communication with a data synchronization module 406, a space-efficient storage module 408, and a heat data module 410. While the data synchronization module 406, the space-efficient storage module 408, and the heat data module 410 are shown as separate from the first and second storage volumes 402 and 404, in some embodiments, one or more of these elements may be stored on one or more of the first and second storage volumes 402 and 404. In other embodiments, one or more of the data synchronization module 406, the space-efficient storage module 408, and the heat data module 410 is stored at a location separate from both the first storage volume 402 and the second storage volume 404.

In some embodiments, the first storage volume 402 is coupled to the data synchronization module 406. In some embodiments, the term "coupled to" refers to a direct or indirect connection across which one-way or two-way communication occurs. In some embodiments, coupled elements are located at a central physical location or in separate physical locations.

In some embodiments, the data synchronization module 406 provides backup information from the first storage volume 402 to the second storage volume 404. In some embodiments, the data synchronization module 406 identifies information from the first storage volume 402 to be included in the backup information or receives instructions identifying the information to be included in the backup information. In other embodiments, the data synchronization module 406 receives the pre-selected backup information from the first storage volume 402. In another embodiment, the heat map transfer system 400 includes a selector module (not shown) which selects the information on the first storage volume 402 to include in the backup information. In some embodiments, the backup information is selected based on a previous synchronization event or other variables.

In some embodiments, the space-efficient storage module 408 receives the backup information, from the data synchronization module 406, and allocates the backup information to the second storage volume 404 according to a space-efficient storage model. In some embodiments, the space-efficient storage module 408 is a component of the second storage volume 404. In other embodiments, the space-efficient storage module 408 is separate from the second storage volume 404. In some embodiments, a portion of the space-efficient storage module 408 corresponds to the first storage volume 402 and manages the storage of data chunks on the first storage volume 402. The space-efficient storage module 408 may generate metadata corresponding to the location of each data chunk on the first storage volume 402.

In some embodiments, the space-efficient storage module 408 includes a portion dedicated to the second storage volume 404. The space-efficient storage module 408 may generate second metadata associated with the location of the data chunks stored on the second storage volume 404.

In some embodiments, the space-efficient storage module 408 receives the backup information from the data synchronization module 406 and organizes the backup information based on a space efficient storage model before, during, or after a synchronization event or communication of the backup information to the second storage volume 404. In some embodiments, the space-efficient storage module 408 determines a state of the second storage volume 404 based on which the space-efficient storage model is applied to the backup information to efficiently store the backup information on the second storage volume.

In the illustrated embodiment, the heat data module 410 is coupled to the first storage volume 402 and the second storage volume 404. As described above, some embodiments of the heat map transfer system 400 include a heat data module 410 coupled to one or both of the first storage volume 402 and the second storage volume 404. In some embodiments, the heat data module 410 is integrated with the second storage volume 404 to apply a status for one or more data chunks in the backup information received at the second storage volume 404.

In some embodiments, the heat data module 410 reads the first metadata from the backup information sent from the first storage volume 402. In other embodiments, the heat data module 410 requests or extracts the first metadata from the first storage volume 402 separate from the backup information. In some embodiments, the heat data module 410 also receives the heat map data from the backup information or separately from the first storage module 402.

In some embodiments, the heat data module 410 reads the first metadata to determine a location for each data chunk in the backup information and looks up the heat map data for each data chunk based on the location determined for each data chunk to identify a status of each data chunk. In some embodiments, the heat data module 410 reads the second metadata from the second storage volume 404 to determine a location of each data chunk on the second storage volume 404 as assigned by the space efficient storage module 408. In some embodiments, the heat data module 410 applies the status to each of the data chunks on the second storage volume 404 as determined from the analysis of the first metadata and the heat map data from the first storage volume 402.

In some embodiments, the heat data module 410 applies the status to each of the data chunks in response to their allocation to the second storage volume 404 by the space-efficient storage module 408 during a synchronization event. In other embodiments, the heat data module 410 determines and applies the status for each data chunk after the space-efficient storage module 408 has distributed all or a portion of the data chunks from the backup information of the synchronization event.

In some embodiments, the heat data module 410 applies the status to each data chunk and further modifies a location of the data chunks on the second storage volume according to the status applied to each data chunk. This is described in more detail below with reference to FIGS. 5 and 6.

In some embodiments, the heat data module 410 communicates with one or more of the data synchronization module 406 and the space-efficient storage module 408 to arrange the data chunks or groups of data chunks on the second storage volume 404 based on the statuses applied to the data chunks. In another embodiment, the head data module 410 adjusts the locations of the data chunks independent of the data synchronization module 406 and the space-efficient storage module 408.

Figure 5:
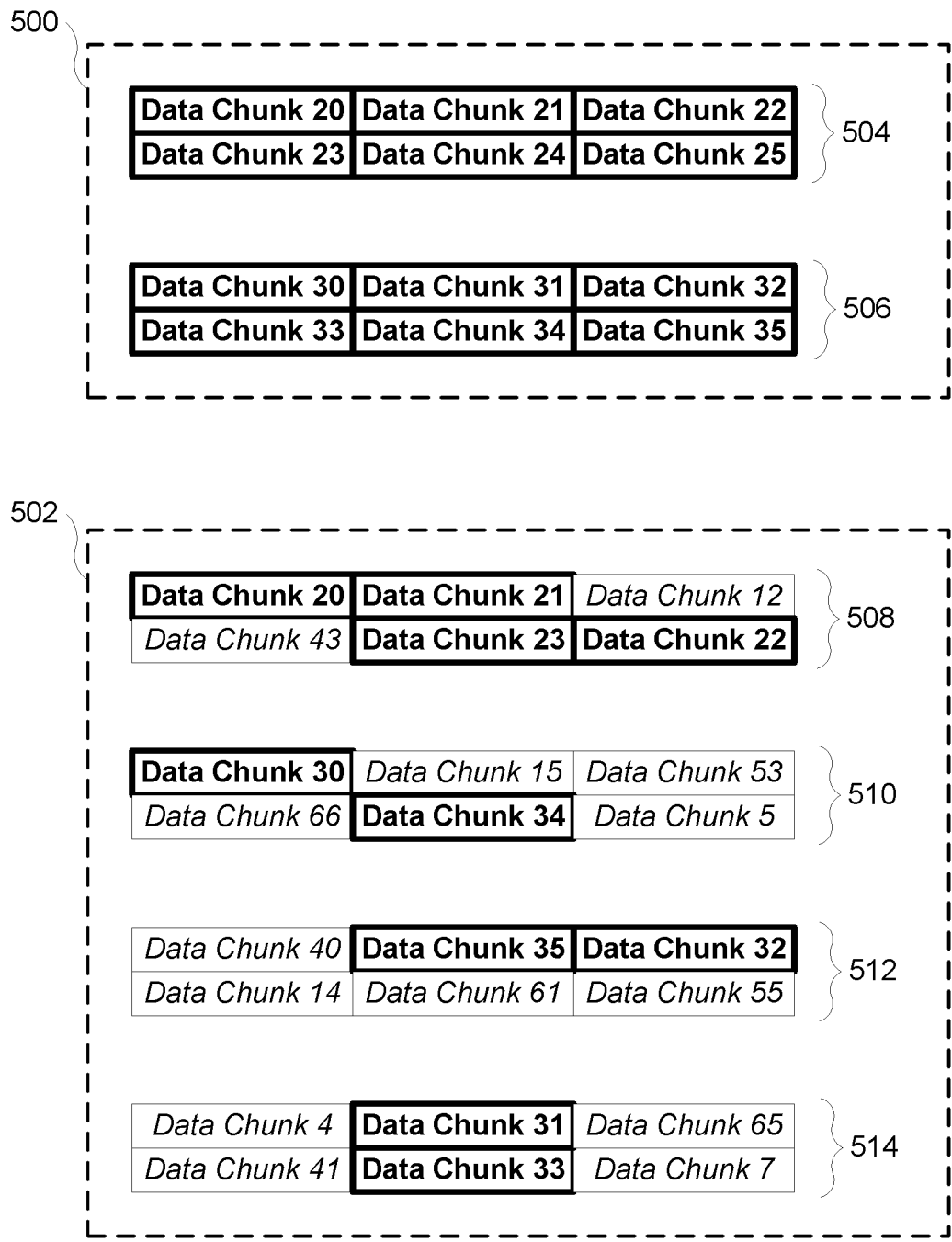
FIG. 5 is a schematic diagram illustrating one embodiment of a first storage volume and a second storage volume in accordance with the present invention.

FIG. 5 is a schematic diagram illustrating one embodiment of a first storage volume 500 and a second storage volume 502 in accordance with the present invention. In some embodiments, the first storage volume 500 is a main storage volume used by a site while the second storage volume 502 is a backup storage volume used as a backup location for the site in the event of crash or failure rendering the first storage volume 500 unavailable to the site. In some embodiments, to provide a backup of the data chunks on the first storage volume 500, the data chunks 20-25 and 30-35 from the first storage volume 500 are copied and sent to the second storage volume 502 for storage.

In some embodiments, selection of the data chunks 20-25 and 30-35 is based on a schedule. In other embodiments, selection of the data chunks 20-25 and 30-35 is in response to a determination that a change has occurred in one or more of the data chunks 20-25 and 30-35 or in the corresponding heat map data. Other trigger events or backup processes may be applied.

In the illustrated embodiment, the data chunks 20-25 are arranged into a first extent 504 and the data chunks 30-35 are arranged into a second extent 506 on the first storage volume 500. While the groups of data chunks are described herein as being organized into extents, other embodiments implement other file systems, storage strategies, or organization structures. In some embodiments, the data chunks 20-25 and 30-35 are marked as "hot" data chunks in the heat map based on historical or forecasted use or access to the data chunks. In other embodiments, the first extent 504 and the second extent 506 are designated as hot extents.

In some embodiments, the first extent 504 and the second extent 506 correspond to storage components which have a performance commensurate with the "hot" status of the corresponding data chunks. In some embodiments, the performance storage components include solid-state or other high-speed or high-efficiency storage or processing components. While the term "hot" and "cold" are used herein to describe the statuses of data chunks and extents, other rating system or approaches may be implemented. For example, a numerical or alphabetic rating system may be applied. Other embodiments include other rating systems for statuses of data chunks, extents, and components.

In the illustrated embodiment, the data chunks 20-25 and 30-35 from the first and second extent 504 and 506, respectively, are copied to the second storage volume 502 in a synchronization event. In some embodiments, the second storage volume 502 is a space-efficient storage volume which allocates the data chunks 20-25 and 30-35 to locations within the second storage volume 502 according to a space-efficient storage model executed by a space-efficient storage module. In the illustrated embodiment, the space-efficient storage module distributes the data chunks 20-25 and 30-35 to non-sequential locations within third, fourth, fifth, and sixth extents 508, 510, 512, and 514 based on the space-efficient storage model. Because the distribution of the data chunks on the second storage volume 502 is different from the first storage volume 500. This renders the heat map for the first storage volume 500 inaccurate relative to the second storage volume 502.

To remedy this inaccuracy, a heat data module (such as the heat data module 410 of FIG. 4) is applied to determine the statuses for each of the data chunks of the third extent 508, the fourth extent 510, the fifth extent 512, and the sixth extent 514 on the second storage volume 502. In some embodiments, a new heat map is generated for the second storage volume 502 based on the heat map data and first metadata from the first storage volume 500 in combination with second metadata from the second storage volume 502 as described above.

Figure 6:
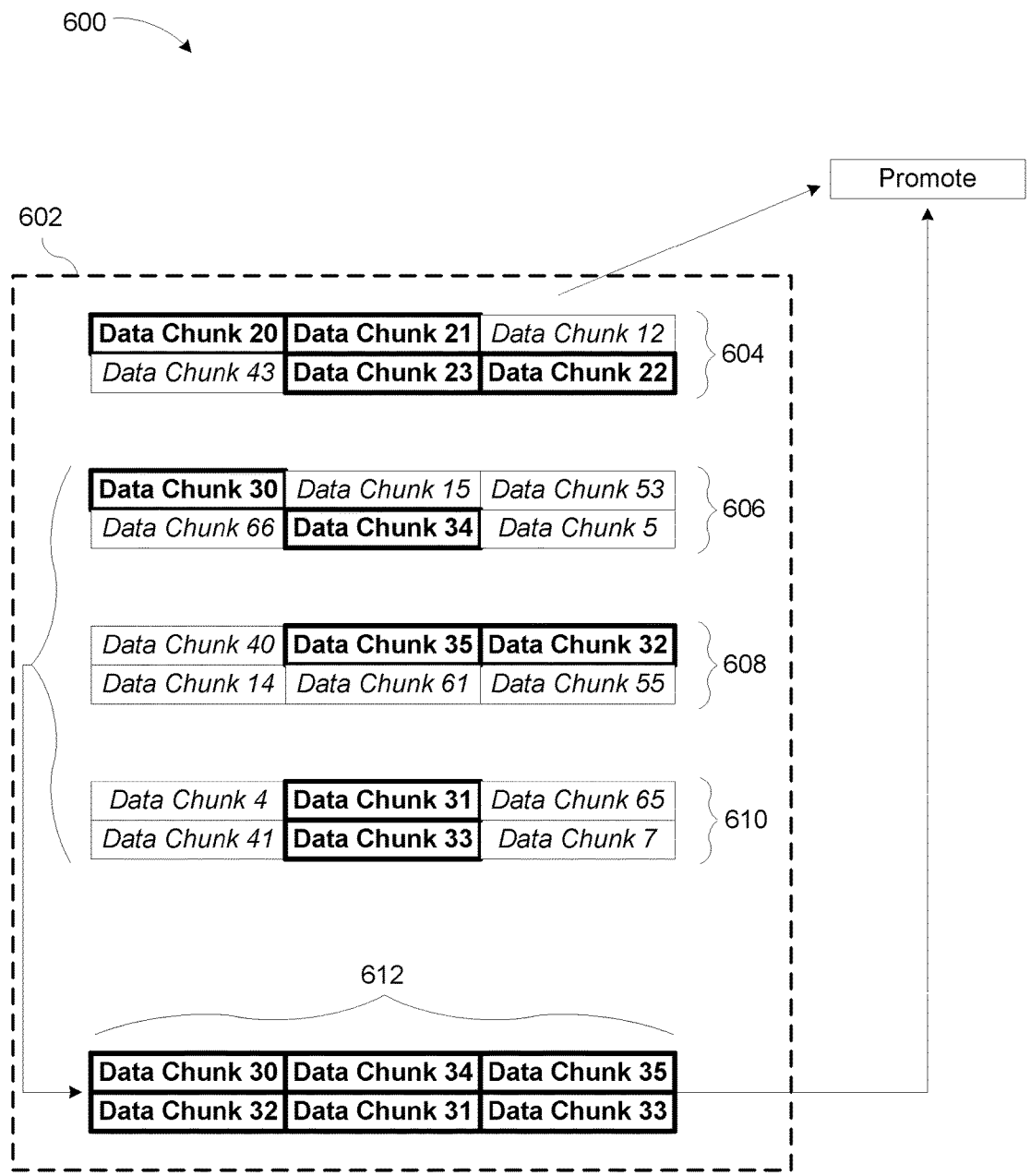
FIG. 6 is a schematic diagram illustrating one embodiment of a promotion system in accordance with the present invention.

FIG. 6 is a schematic diagram illustrating one embodiment of a promotion system 600 in accordance with the present invention. In the illustrated embodiment, a second storage volume 602 includes a first extent 604, a second extent 606, a third extent 608, and a fourth extent 610.

In the illustrated embodiment, the second storage volume 602 or a component of the second storage volume 602 identifies the data chunks of the extents 604, 606, 608, and 610. As described above, analysis of the data chunks may be completed by a heat data module (such as heat data module 410 of FIG. 4). In some embodiments, the status of each data chunk is added to a new heat map for the second storage volume 602 or the copy of the heat map for a first storage volume is modified to correspond with the location of the data chunks on the second storage volume 602. In another embodiment, the data chunks are arranged to correspond with the heat map data.

In some embodiments, the first extent 604 is checked to calculate a quantity of data chunks which have a "hot" status (shown with heavier borders and bolded labels). In some embodiments, if the number of hot data chunks in a particular extent exceeds a threshold, the entire extent (such as the first extent 604) is promoted to a better performance location on the second storage volume 602. In other embodiments, the first extent 604 is checked to determine if a percentage of the data chunks of the first extent 604 exceeds a hot threshold. In response to a determination that the percentage is above the threshold, the first extent 604 is promoted. In other embodiments, an average workload metric describing the average load on each of the data chunks in the extent is applied to determine if an extent should be promoted.

In some embodiments, in response to a determination that the number of hot data chunks or the percentage of hot data chunks on the first extent 604 does not exceed a threshold, individual hot data chunks are promoted from the first extent 604. In other embodiments, in response to the determination that the number of hot data chunks or the percentage of hot data chunks on the first extent 604 does not exceed the threshold, the first extent 604 is marked as cold. In other embodiments, in response to marking the first extent 604 as cold, the individual hot data chunks may be promoted out of the first extent 604.

In the illustrated embodiment, the second extent 606 has two data chunks (data chunk 30 and data chunk 34) which are labeled as hot. In some embodiments, this quantity of hot data chunks is not sufficient to trigger a promoting of the second extent 606 as hot. In other embodiments, two hot data chunks is a sufficient number or percentage of the second extent 606 to promote the second extent 606 as hot. In some embodiments, the individual hot data chunks are promoted out of the second extent 606 to a new extent or to an extent preset as hot, such as a hot extent 612.

In the illustrated embodiment, hot data chunks from the second extent 606, the third extent 608, and the fourth extent 610 are promoted out of their corresponding extents into the hot extent 612. In some embodiments, the hot extent 612 is a pre-designated hot extent. In some embodiments, the hot extent 612 is an extent in a high-performance tier that has space available to store data chunks. In other embodiments, the hot extent 612 is a non-promoted extent that is promoted in response to a determination that the hot data chunks moved into the hot extent 612 are sufficient to trigger promotion of the hot extent 612.

In some embodiments, the data chunks that are not designated as hot chunks may also be removed from their respective extents and consolidated into one or more "cold" extents. In some embodiments, the non-hot data chunks are consolidated to the cold extents and the individual data chunks are updated to a "cold" status or some other non-hot status. In other embodiments, the non-hot data chunks are left in their current non-hot extents.

In some embodiments, in response to completing promotion of one or more data chunks or extents, the second storage volume 602 applies a tiering technology (such as the heat data module 410 of FIG. 4) to generate a heat map specific to the second storage volume 602 or modify the heat map from the first storage volume. In this manner, the second storage volume 602 gains the benefit of the heat map data generated at the first storage volume without having to rebuild the heat map data from activity on the second storage volume going forward. This may improve the operation of the second storage volume by increasing efficiency in resource allocation and reducing bottlenecks for hot data chunks on lower tier components.

Figure 7:
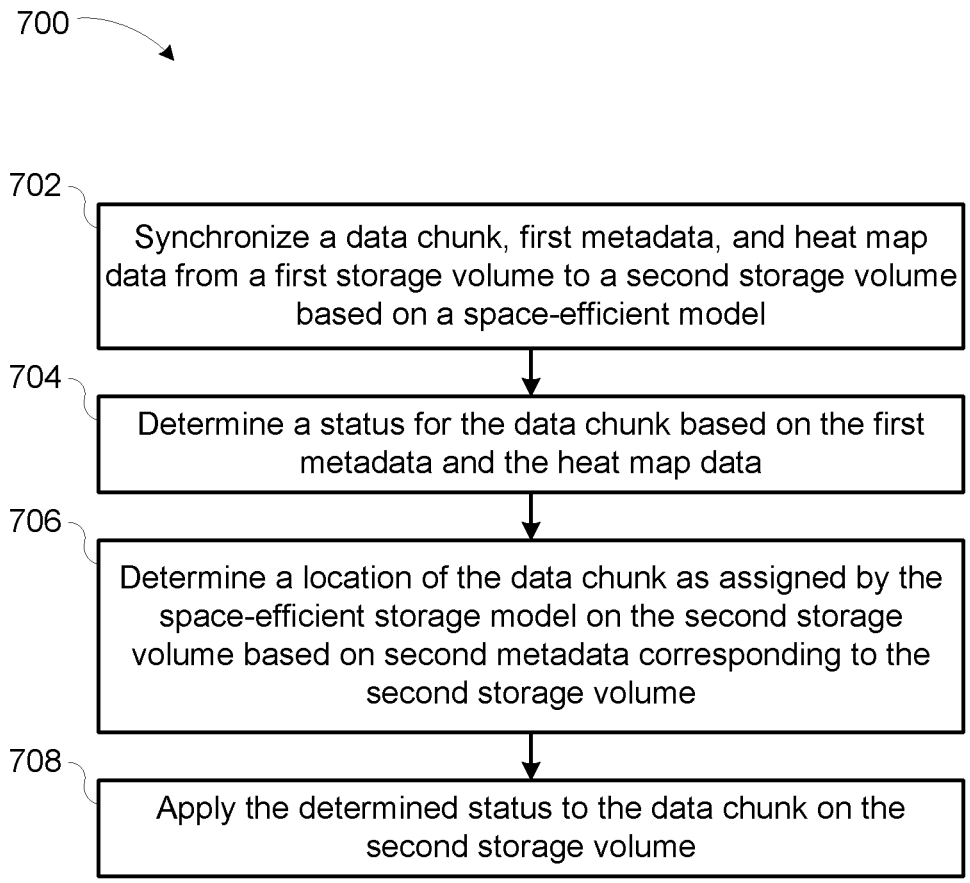
FIG. 7 is a schematic flow chart diagram illustrating one embodiment of a method in accordance with the present invention.

FIG. 7 is a schematic flow chart diagram illustrating one embodiment of a method 700 in accordance with the present invention. In the illustrated embodiment, the method 700 includes synchronizing, at block 702, a data chunk, first metadata, and heat map data from a first storage volume to a second storage volume based on a space-efficient model.

At block 704, a status for the data chunk is determined based on the first metadata and the heat map data. In some embodiments, the status for the data chunk is determined by identifying, based on the first metadata, an extent on the first storage volume from which the data chunk was copied and identifying the status or promotion level of the identified extent based on the heat map data from the first storage volume. In some embodiments, the synchronization event occurs in response to a trigger condition. In some embodiments, the trigger condition includes one or more of a time-based schedule, detection of an update to data on the first storage location, a detection of a fault or error, reaching a load threshold on the first storage volume, or other conditions.

In other embodiments, the heat map data has a granularity level identifying separate data chunks and the status for the data chunk is determined based on an individual status of the original data chunk in the heat map data in the second storage volume. In these embodiments, the heat map data includes separate heat data for each original data chunk location on the first storage volume. In these embodiments, the location of the data chunk for which the status is being determined, is identified from the first metadata and the location is used to look up the status of the data chunk on the heat map data for the first storage volume.

In other embodiments, the granularity level of the heat map data is based on extents and the metadata provides a location identifying a particular extent from the heat map data which identifies a status for the extent on the first storage volume and, by association, the data chunk corresponding to the extent.

At block 706, a location of the data chunk, as assigned by the space-efficient storage model, on the second storage volume is determined based on second metadata corresponding to the second storage volume. In some embodiments, the second metadata describe a relation between the virtual address of the data chunk and the physical address of the data chunk. In some embodiments, the second metadata is used to determine the storage location of the data chunk on the second storage volume. In some embodiments, the location of the data chunk is an extent of data chunks on the second storage volume. In other embodiments, the location of the data chunk is unique to the data chunk.

At block 708, the determined status is applied to the data chunk on the second storage volume. In some embodiments, applying the determined status includes adding the determined status to a new heat map corresponding to the second storage volume. In other embodiments, applying the determined status includes promoting the data chunk to a location on the second storage volume corresponding to the determined status of the data chunk. In some embodiments, applying the determined status includes promoting the containing extent to a location on the second storage volume corresponding to the determined status.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A heat map transfer system comprising:
a plurality of storage volumes comprising a first storage volume and a second storage volume, wherein the second storage volume comprises a backup storage location for the first storage volume;
a data synchronization module coupled to the first storage volume and the second storage volume, the data synchronization module provides a backup of information on the first storage volume by synchronizing information from the first storage volume to the second storage volume during a synchronization event, the information comprising data chunks, heat map data relating to the data chunks, and first metadata relating to the first storage volume;
a space-efficient storage module coupled to the second storage volume, the space-efficient storage module receives the information from the data synchronization module and allocates the information to the second storage volume in accordance with a space-efficient storage model; and
a heat data module coupled to the second storage volume, the heat data module reads the first metadata and the heat map data and adjusts a location of the data chunks in the second storage volume based on the heat map data.

2. The system of claim 1, wherein the heat data module determines a status of each of the data chunks based on the first metadata and the heat map data, wherein the status describes a priority of the corresponding data chunk.

3. The system of claim 2, wherein the heat map data describes a priority of an extent, of the first storage volume, associated with at least one of the data chunks.

4. The system of claim 1, wherein the heat data module determines a location of each of the data chunks on the second storage volume based on a second metadata associated with the second storage volume.

5. The system of claim 4, wherein the second metadata comprises a data structure to translate a virtual address to a physical location on the second storage volume for each data chunk.

6. The system of claim 1, wherein the heat data module initiates recombination of the data chunks in the second storage volume during the synchronization event.

7. The system of claim 1, wherein the heat data module adjusts the data chunks in the second storage volume after completion of the synchronization event.

8. A method comprising:
synchronizing a data chunk, first metadata, and heat map data from a first storage volume to a second storage volume based on a space-efficient storage model;
determining a status for the data chunk based on the first metadata and the heat map data;
determining a location of the data chunk as assigned by the space-efficient storage model on the second storage volume based on second metadata corresponding to the second storage volume; and
applying the determined status to the data chunk on the second storage volume.

9. The method of claim 8, wherein determining the status for the data chunk based on the first metadata and the heat map data comprises determining a location of the data chunk on the first storage volume based on the first metadata and determining the status of the data chunk by looking up the location of the data chunk on the first storage volume within the heat map data.

10. The method of claim 8, wherein applying the status to the data chunk on the second storage volume comprises moving the data chunk to an extent on the second storage volume having a performance corresponding to the status of the data chunk.

11. The method of claim 8, wherein applying the determined status to the data chunk on the second storage volume comprises marking an extent with a status in response to a determination that the extent comprises a predetermined quantity of data chunks having a corresponding status.

12. The method of claim 11, further comprising promoting the marked extent on the second storage volume according to the status of the marked extent.

13. The method of claim 8, wherein the second metadata comprises a data structure describing a relationship between a virtual address and a physical location of the data chunk on the second storage volume.

14. The method of claim 8, wherein applying the determined status to the data chunk on the second storage volume further comprises modifying a location of the data chunk on the second storage volume during a synchronization event for another data chunk.

15. The method of claim 8, wherein applying the determined status to the data chunk on the second storage volume further comprises modifying a location of the data chunk on the second storage volume after a synchronization event for another data chunk.

16. A computer program product for providing heat map organization of a data chunk in a space-efficient backup storage, the computer program product comprising a computer readable storage medium having program instructions embodied therewith, the program instructions readable/executable by a processor to cause the processor to:
synchronize, by the processor, the data chunk, first metadata, and heat map data from a first storage volume to a second storage volume based on a space-efficient storage model;
determine, by the processor, a status for the data chunk based on the first metadata and the heat map data;
determine, by the processor, a location of the data chunk as assigned by the space-efficient storage model on the second storage volume based on second metadata corresponding to the second storage volume; and
apply, by the processor, the determined status to the data chunk on the second storage volume.

17. The computer program product of claim 16, wherein the program instructions to cause the processor to determine the status for the data chunk based on the first metadata and the heat map data, further cause the processor to determine a location of the data chunk on the first storage volume based on the first metadata and determine the status of the data chunk by looking up the location of the data chunk on the first storage volume within the heat map data.

18. The computer program product of claim 16, wherein the program instructions to cause the processor to apply the determined status to the data chunk on the second storage volume are further to cause the processor to move the data chunk to an extent on the second storage volume having a performance corresponding to the status of the data chunk.

19. The computer program product of claim 16, wherein the program instructions to cause the processor to apply the determined status to the data chunk on the second storage volume are further to cause the processor to mark an extent with a status in response to a determination that the extent comprises a predetermined quantity of data chunks having a corresponding status.

20. The computer program product of claim 19, wherein the program instructions are further to cause the processor to promote the marked extent on the second storage volume according the status of the marked extent.

* * * * *